(12) United States Patent
Kawamoto

(10) Patent No.: US 10,951,099 B2
(45) Date of Patent: Mar. 16, 2021

(54) METHOD FOR MANUFACTURING ROTOR, AND ROTOR

(71) Applicant: DMG MORI CO., LTD., Yamatokoriyama (JP)

(72) Inventor: Michio Kawamoto, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 262 days.

(21) Appl. No.: 16/097,709

(22) PCT Filed: Jan. 27, 2017

(86) PCT No.: PCT/JP2017/002933
§ 371 (c)(1),
(2) Date: Oct. 30, 2018

(87) PCT Pub. No.: WO2017/199470
PCT Pub. Date: Nov. 23, 2017

(65) Prior Publication Data
US 2019/0140529 A1 May 9, 2019

(30) Foreign Application Priority Data
May 20, 2016 (JP) ............................ JP2016-101454

(51) Int. Cl.
*H02K 15/02* (2006.01)
*H02K 15/10* (2006.01)
(Continued)

(52) U.S. Cl.
CPC .............. *H02K 15/03* (2013.01); *H02K 1/27* (2013.01); *H02K 1/278* (2013.01); *H02K 2201/06* (2013.01); *Y10T 29/49012* (2015.01)

(58) Field of Classification Search
CPC .......... H02K 15/03; H02K 1/27; H02K 1/278; H02K 2201/06; Y10T 29/49012; Y10T 29/53143
(Continued)

(56) References Cited

U.S. PATENT DOCUMENTS 5,397,951 A * 3/1995 Uchida .................. H02K 1/278
310/156.21
6,657,349 B2 * 12/2003 Fukushima .......... H02K 1/2733
310/156.45
(Continued)

FOREIGN PATENT DOCUMENTS

CN 101689772 A 3/2010
JP 58-141663 A 8/1983
(Continued)

OTHER PUBLICATIONS

International Search Report dated Apr. 11, 2017 in PCT/JP2017/002933 filed Jan. 27, 2017.

*Primary Examiner* — Donghai D Nguyen
(74) *Attorney, Agent, or Firm* — Oblon, McClelland, Maier & Neustadt, L.L.P.

(57) ABSTRACT

A rotor includes a plurality of permanent magnets inclined relative to the axial direction of a rotor core. A method for manufacturing the rotor includes producing each of the permanent magnets, and providing the permanent magnets on the outer periphery of the rotor core. The producing of each of the permanent magnets includes working a magnet block into a shape such that a first surface and a second surface have a parallelogram shape, a third surface and a fourth surface are parallel to each other, and a fifth surface and a sixth surface extend planarly from the third surface to the fourth surface. The providing of the permanent magnets includes arranging the permanent magnets so that, between the permanent magnets adjacent to each other, the fifth surface and the sixth surface face each other.

3 Claims, 13 Drawing Sheets

(51) Int. Cl.
*H02K 15/03* (2006.01)
*H02K 1/27* (2006.01)

(58) Field of Classification Search
USPC .............................. 29/598, 732; 310/156.045
See application file for complete search history.

(56) References Cited

U.S. PATENT DOCUMENTS

| | | | |
|---|---|---|---|
| 8,933,605 B2 * | 1/2015 | Jiang | ...................... H02K 1/278 310/156.47 |
| 2005/0012419 A1 | 1/2005 | Kometani et al. | |
| 2009/0033174 A1 | 2/2009 | Niguchi et al. | |
| 2010/0013338 A1 | 1/2010 | Takahashi | |

FOREIGN PATENT DOCUMENTS

| | | |
|---|---|---|
| JP | 60-226749 A | 11/1985 |
| JP | 2003-70214 A | 3/2003 |
| JP | 2005-20930 A | 1/2005 |
| JP | 2006-109590 A | 4/2006 |
| JP | 2008-312305 A | 12/2008 |
| JP | 2009-27777 A | 2/2009 |
| JP | 2009-33927 A | 2/2009 |
| JP | 2014-138511 A | 7/2014 |
| WO | WO 2008/142519 A1 | 11/2008 |

* cited by examiner

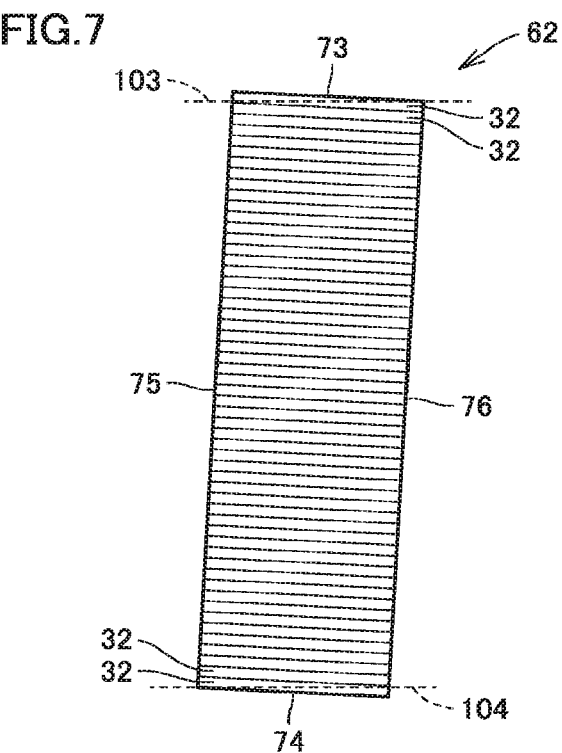
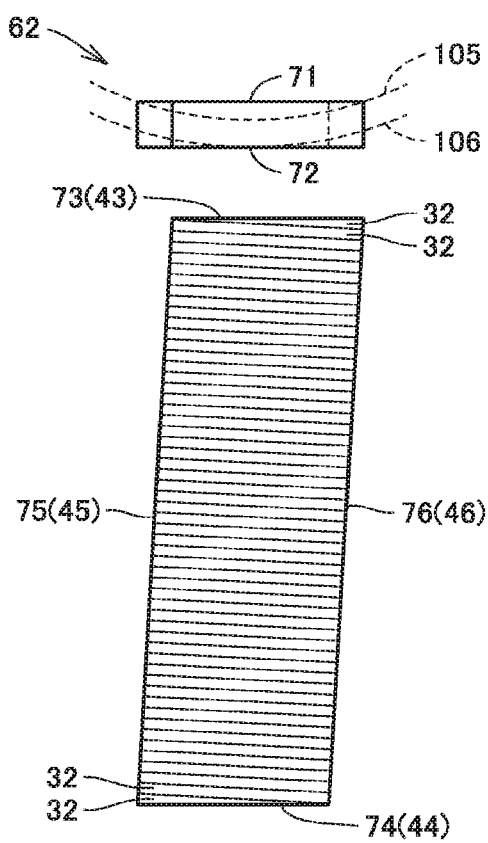

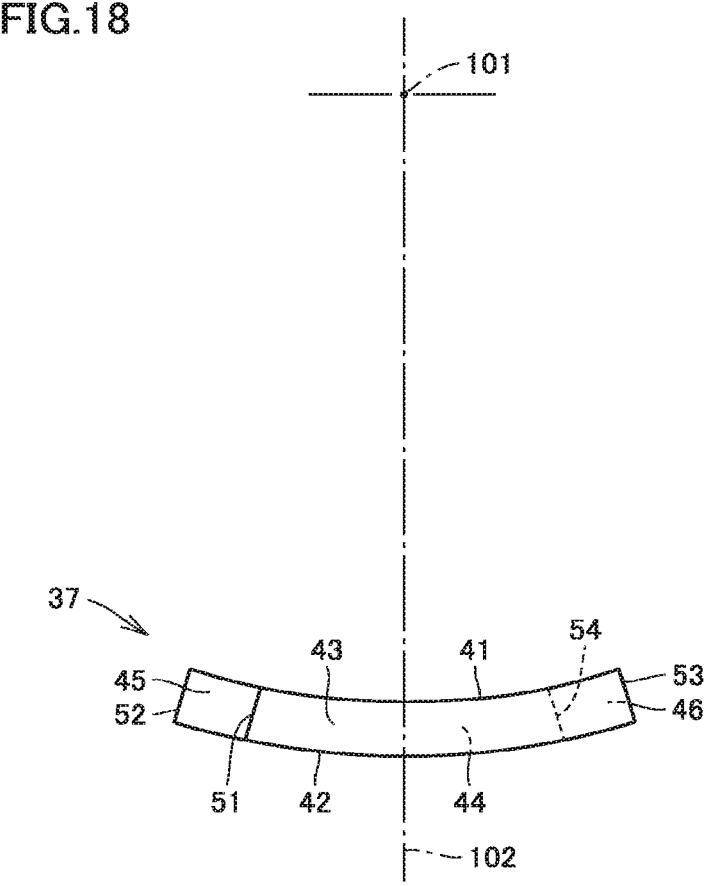

METHOD FOR MANUFACTURING ROTOR, AND ROTOR

TECHNICAL FIELD

The present invention relates to a method for manufacturing a rotor, and a rotor.

BACKGROUND ART

Regarding a conventional rotor, for example, Japanese Patent Laying-Open No. 2006-109590 discloses a brushless motor designed to reduce cogging torque and simplify the manufacturing process of a rotor (PTL 1). The brushless motor disclosed in PTL 1 includes a rotor, and a plurality of permanent magnets arranged in a direction skewed with respect to the rotational central axis and glued to the outer peripheral surface of the rotor. The outer peripheral surface of the rotor has a filling groove to be filled with an adhesive.

CITATION LIST

Patent Literature

PTL 1: Japanese Patent Laying-Open No. 2006-109590

SUMMARY OF INVENTION

Technical Problem

As disclosed in the above-mentioned PTL 1, a rotor is known that has permanent magnets arranged in a skewed manner with respect to the rotational axis of the rotor in order to reduce cogging torque. In such a rotor, an ideal skew form of permanent magnets is a form such that permanent magnets parallel to the rotational axis of the rotor are twisted around the rotational axis. Such an ideal skew form, however, makes the manufacturing process of the permanent magnets complicated.

Therefore, an object of the present invention is to solve the above problem, and to provide a method for manufacturing a rotor having reduced cogging torque by a simple manufacturing process, and to provide such a rotor.

Solution to Problem

A method for manufacturing a rotor according to the present invention is a method for manufacturing a rotor including a rotor core and a plurality of permanent magnets arranged in the circumferential direction on the outer periphery of the rotor core, the plurality of permanent magnets being arranged so as to be inclined relative to the axial direction of the rotor core. The method for manufacturing a rotor includes: producing each of the permanent magnets; and providing the plurality of permanent magnets on the outer periphery of the rotor core. The producing of each of the permanent magnets includes: preparing a thin plate magnet block; and working the magnet block into a shape such that the magnet block includes: a first surface and a second surface disposed on opposite sides in the thickness direction; a third surface and a fourth surface continuous with the first surface and the second surface, and disposed on opposite sides; and a fifth surface and a sixth surface continuous with the first surface, the second surface, the third surface, and the fourth surface, and disposed on opposite sides, the first surface and the second surface each having a parallelogram shape in plan view, the third surface and the fourth surface being parallel to each other, the fifth surface and the sixth surface extending planarly from the third surface to the fourth surface. The providing of the plurality of permanent magnets on the outer periphery of the rotor core includes arranging the plurality of permanent magnets on the outer periphery of the rotor core so that: the first surface faces the outer peripheral surface of the rotor core; the third surface and the fourth surface are positioned at both ends of each of the permanent magnets in the axial direction of the rotor core; and between the permanent magnets adjacent to each other, the fifth surface and the sixth surface face each other.

Advantageous Effects of Invention

The present invention provides a method for manufacturing a rotor having reduced cogging torque by a simple manufacturing process, and provides such a rotor.

BRIEF DESCRIPTION OF DRAWINGS

FIG. 7 shows a fourth step in a method for manufacturing a rotor in embodiment 1 of the present invention.

FIG. 8 shows a fourth step in a method for manufacturing a rotor in embodiment 1 of the present invention.

FIG. 18 shows a permanent magnet constituting a rotor in an embodiment 3 of the present invention.

EMBODIMENTS TO CARRY OUT THE INVENTION

Figure 1:
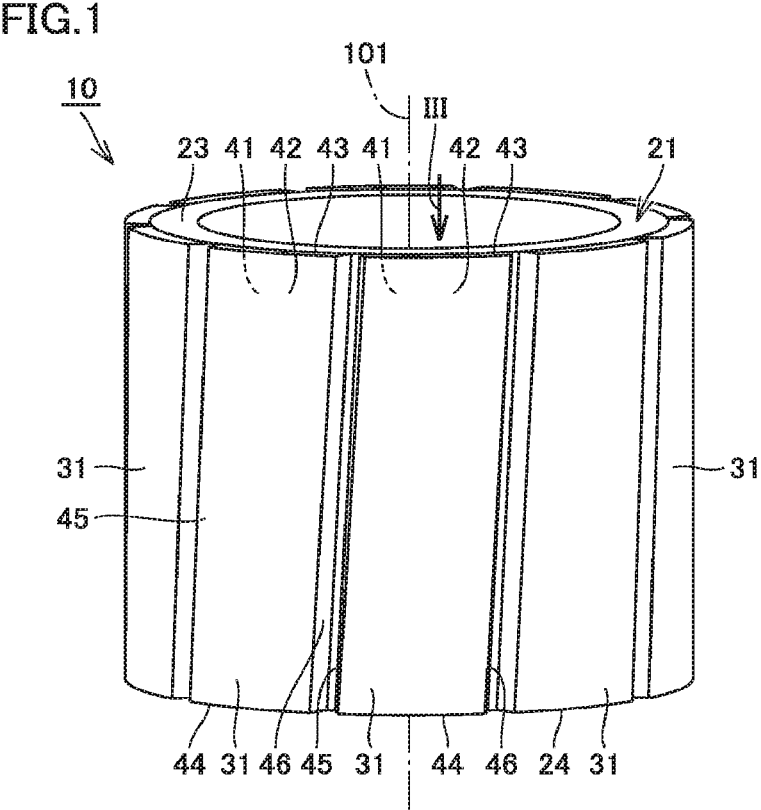
FIG. 1 is a perspective view showing a rotor in an embodiment 1 of the present invention.

Embodiments of the present invention are described with reference to the drawings. In the drawings referred to hereinafter, identical or corresponding members are identically denoted.

Embodiment 1

FIG. 1 is a perspective view showing a rotor in embodiment 1 of the present invention. With reference to FIG. 1, a rotor 10 in the present embodiment constitutes an electric motor by being paired with a stator (not shown) disposed on the outer periphery of rotor 10 with a gap lying between the stator and the outer periphery of rotor 10. Rotor 10 is used for an electric motor for driving a main shaft of a machining center to rotate.

Rotor 10 is supported rotatably around an imaginary central axis 101 shown in FIG. 1. When the electric motor is operating, rotor 10 rotates around central axis 101. The maximum rotation rate of rotor 10 is, for example, more than or equal to 10000 rpm.

Figure 2:
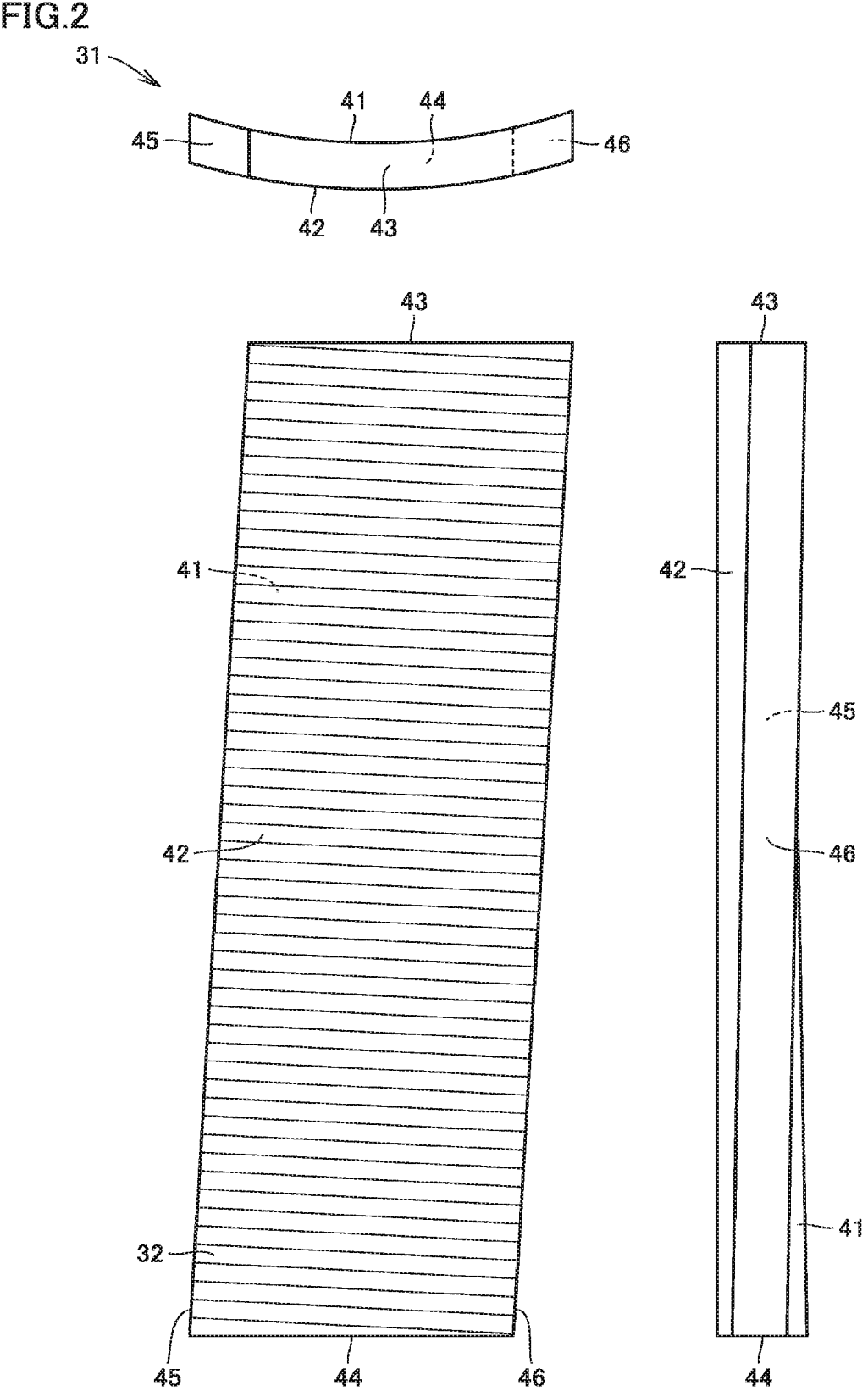
FIG. 2 is a trihedral view showing a permanent magnet constituting the rotor in FIG. 1.

FIG. 2 is a trihedral view showing a permanent magnet constituting the rotor in FIG. 1. With reference to FIG. 1 and FIG. 2, rotor 10 includes a rotor core 21 and a plurality of permanent magnets 31.

Rotor core 21 is cylindrical in shape. Rotor core 21 has a shape such that it cylindrically extends around central axis 101 in the axial direction. Rotor core 21 has an end face 23 and an end face 24. End face 23 and end face 24 are disposed respectively at one end and the other end of rotor core 21 in the axial direction of central axis 101. Each of end face 23 and end face 24 extends in a plane orthogonal to central axis 101.

Rotor core 21 is made of a magnetic material. In the present embodiment, rotor core 21 is constituted of a plurality of magnetic steel sheets stacked in the axial direction of central axis 101.

A plurality of permanent magnets 31 are provided on the outer periphery of rotor core 21. A plurality of permanent magnets 31 are arranged at intervals in the circumferential direction around central axis 101. A plurality of permanent magnets 31 are arranged at regular intervals. Permanent magnets 31 are bonded to the outer peripheral surface of rotor core 21 with an adhesive.

Each permanent magnet 31 comprises division pieces 32 of magnet block (hereinafter also referred to as "block division pieces 32") bonded together (see a front view of permanent magnet 31 shown in FIG. 2).

Block division pieces 32 are stacked along the axial direction of central axis 101. Block division pieces 32 are bonded together with an adhesive. In the present embodiment, 55 block division pieces 32 are bonded together to constitute each permanent magnet 31. Each block division piece 32 is 2 mm thick by way of example.

Each permanent magnet 31 constituted of a plurality of block division pieces 32 bonded together can reduce an eddy current loss at rotor 10 when the electric motor operates.

Surfaces of each permanent magnet 31 (a first surface 41, a second surface 42, a third surface 43, a fourth surface 44, a fifth surface 45, and a sixth surface 46 described later) have a coating thereon. The bonding surfaces between block division pieces 32 do not have a coating.

Each permanent magnets 31 has a skew form such that each permanent magnet 31 is arranged so as to be inclined relative to the axial direction of rotor core 21 (the axial direction of central axis 101). The skew form of each permanent magnet 31 is described specifically hereinafter.

Each permanent magnet 31 has first surface 41, second surface 42, third surface 43, fourth surface 44, fifth surface 45, and sixth surface 46.

First surface 41 and second surface 42 are disposed on the opposite sides. First surface 41 is disposed so as to face the outer peripheral surface of rotor core 21. Permanent magnet 31 is bonded to rotor core 21 with an adhesive being put between the outer peripheral surface of rotor core 21 and first surface 41. Second surface 42 faces a stator (not shown) disposed with a gap lying between the stator and rotor 10.

First surface 41 and second surface 42 are larger in area than third surface 43, fourth surface 44, fifth surface 45, and sixth surface 46. As seen in a radial direction with respect to central axis 101, each of first surface 41 and second surface 42 has a parallelogram shape in plan view. Each of first surface 41 and second surface 42 is formed by a curved surface extending in a circular arc shape in the circumferential direction around central axis 101. In each of first surface 41 and second surface 42, edge sides along the axial direction of central axis 101 are longer than edge sides along the circumferential direction around central axis 101.

Each of first surface 41 and second surface 42 does not necessarily have a shape of the above-described curved surface. For example, if the outer peripheral surface of rotor core 21 has a polygonal cross section, first surface 41 may have a planar shape according to the outer peripheral surface of rotor core 21. Second surface 42 may have a planar shape or a curved shape extending in a circular arc shape protruding at the central area in the circumferential direction, in accordance with the characteristics of the electric motor.

Third surface 43 and fourth surface 44 are continuous with first surface 41 and second surface 42, and are disposed on the opposite sides. Third surface 43 and fourth surface 44 are positioned at the both ends of permanent magnet 31 in the axial direction of central axis 101.

Third surface 43 is disposed on the same side as end face 23 of rotor core 21 in the axial direction of central axis 101, and fourth surface 44 is disposed on the same side as end face 24 of rotor core 21 in the axial direction of central axis 101. Third surface 43 is disposed to be flush with end face 23 of rotor core 21, and fourth surface 44 is disposed to be flush with end face 24 of rotor core 21.

Each of third surface 43 and fourth surface 44 has a planar shape. Each of third surface 43 and fourth surface 44 is disposed in a plane orthogonal to central axis 101. Third surface 43 and fourth surface 44 are parallel to each other. As seen in the axial direction of central axis 101, each of third surface 43 and fourth surface 44 extends in a belt shape in the circumferential direction around central axis 101. Third surface 43 and fourth surface 44 are continuous with the edge sides of first surface 41 and second surface 42 along the circumferential direction around central axis 101, each of first surface 41 and second surface 42 having a parallelogram shape in plan view.

Fifth surface 45 and sixth surface 46 are continuous with first surface 41, second surface 42, third surface 43, and fourth surface 44, and are disposed on the opposite sides. Between permanent magnets 31 adjacent to each other, fifth surface 45 and sixth surface 46 face each other.

Fifth surface 45 and sixth surface 46 extend planarly from third surface 43 to fourth surface 44. Fifth surface 45 and sixth surface 46 are parallel to each other. Each of fifth surface 45 and sixth surface 46 is disposed in a plane in an oblique direction relative to the axial direction of central axis 101. Each of fifth surface 45 and sixth surface 46 is a smooth plane extending along the axial direction of central axis 101. Fifth surface 45 and sixth surface 46 are continuous with the edge sides of first surface 41 and second surface 42 along the axial direction of central axis 101, each of first surface 41 and second surface 42 having a parallelogram shape in plan view.

Figure 3:
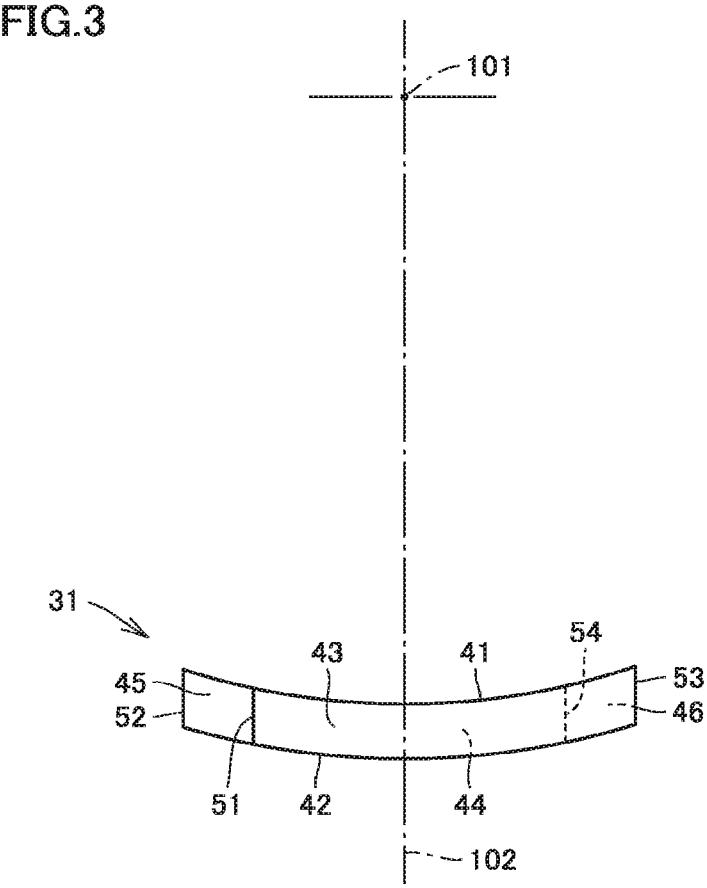
FIG. 3 shows a permanent magnet in FIG. 1 as seen from the direction indicated by arrow III.

FIG. 3 shows a permanent magnet in FIG. 1 as seen from the direction indicated by arrow III. With reference to FIG.

3, an edge line 51 is formed at the position where third surface 43 and fifth surface 45 intersect. An edge line 52 is formed at the position where fifth surface 45 and fourth surface 44 intersect. An edge line 53 is formed at the position where third surface 43 and sixth surface 46 intersect. An edge line 54 is formed at the position where sixth surface 46 and fourth surface 44 intersect.

Edge line 51, edge line 52, edge line 53, and edge line 54 are parallel to one another. Assuming an imaginary straight line 102 extending from central axis 101 toward the central position of permanent magnet 31 in the circumferential direction (the central position between edge line 52 and edge line 53), imaginary straight line 102 is parallel to edge line 51, edge line 52, edge line 53, and edge line 54.

Fifth surface 45 is formed by a plane in which straight lines parallel to edge line 51 and edge line 52 are continuously arranged between edge line 51 and edge line 52. Sixth surface 46 is formed by a plane in which straight lines parallel to edge line 53 and edge line 54 are continuously arranged between edge line 53 and edge line 54.

FIG. 4 to FIG. 8 show steps of a method for manufacturing a rotor in embodiment 1 of the present invention. The steps for manufacturing rotor 10 in FIG. 1 will now be described with a method for manufacturing a rotor in embodiment 1 of the present invention.

Figure 4:
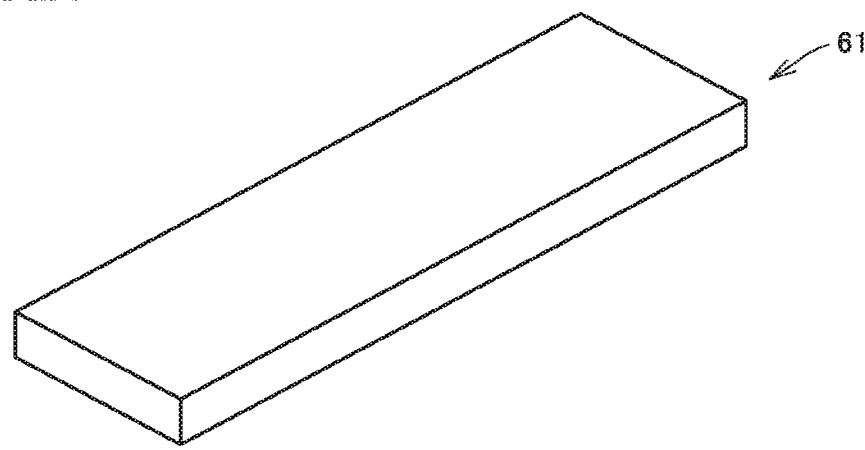
FIG. 4 shows a first step in a method for manufacturing a rotor in embodiment 1 of the present invention.

With reference to FIG. 4, first, a step of producing permanent magnet 31 is performed. In this step, a thin plate magnet block 61 is prepared. Magnet block 61 is in the shape of a thin rectangular parallelepiped. Magnet block 61 has a rectangular shape in plan view having a lengthwise direction and a widthwise direction, as seen in the thickness direction of magnet block 61.

Figure 5:
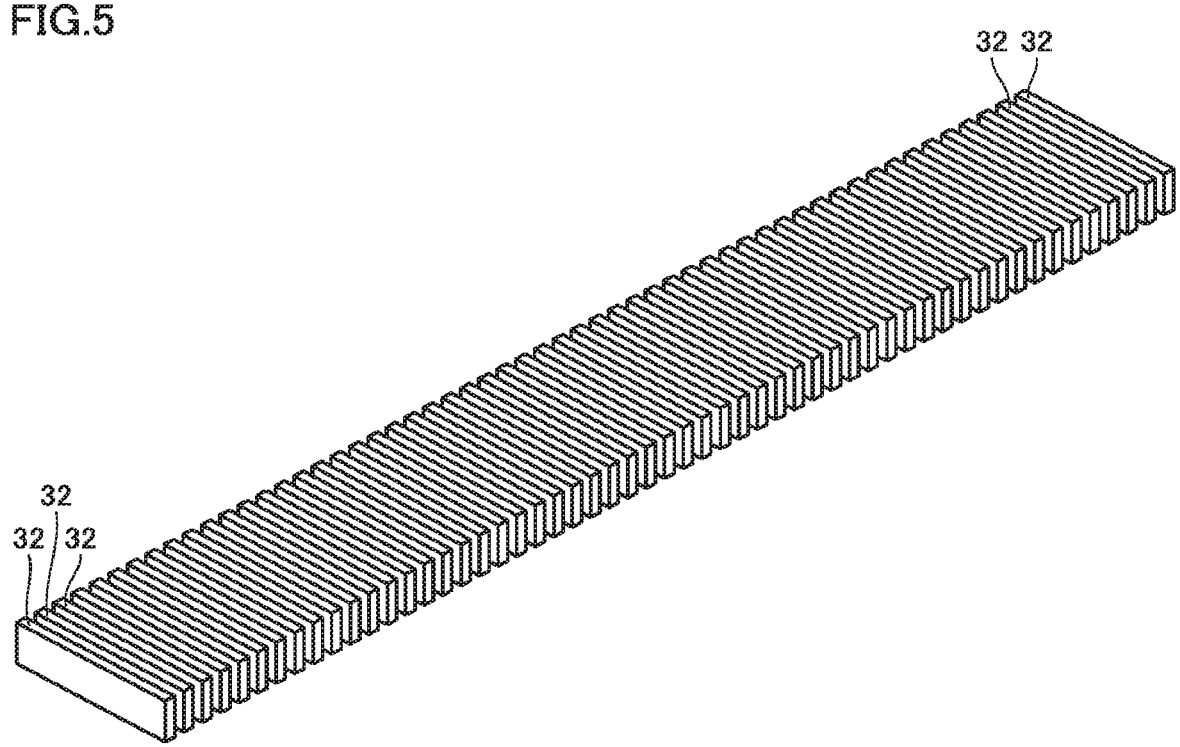
FIG. 5 shows a second step in a method for manufacturing a rotor in embodiment 1 of the present invention.

With reference to FIG. 5, magnet block 61 is then cut in its thickness direction to obtain block division pieces 32, which are division pieces of magnet block 61.

In the present embodiment, magnet block 61 is cut along the widthwise direction of the rectangular shape in plan view. Magnet block 61 is divided into 55 block division pieces 32. Each block division piece 32 has a thin plate shape such that the lengthwise direction of magnet block 61 in plan view is the thickness direction of block division piece 32.

Figure 6:
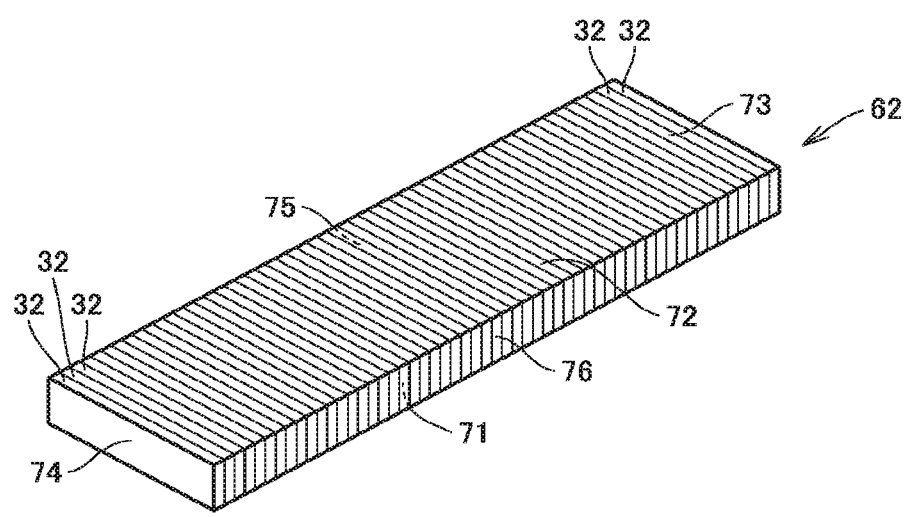
FIG. 6 shows a third step in a method for manufacturing a rotor in embodiment 1 of the present invention.

With reference to FIG. 6, block division pieces 32 are then bonded together to form a magnet block (hereinafter referred to as a "division-piece-bonded block") 62 having a shape corresponding to the shape of original magnet block 61.

Specifically, a plurality of block division pieces 32 are stacked in one direction so that the cutting surfaces of block division pieces 32 in the previous step face each other. Block division pieces 32 are bonded together with an adhesive. Division-piece-bonded block 62 obtained in this step is in the shape of a thin rectangular parallelepiped corresponding to the shape of magnet block 61. However, division-piece-bonded block 62 is not necessarily the same as magnet block 61 in shape due to generation of swarf during cutting of magnet block 61, the thicknesses of the adhesive layers, unevenness in accuracy of assembling, and the like.

Division-piece-bonded block 62 has a first face 71, a second face 72, a third face 73, a fourth face 74, a fifth face 75, and a sixth face 76.

First face 71 and second face 72 are disposed on the opposite sides. Each of first face 71 and second face 72 is a plane orthogonal to the thickness direction of division-piece-bonded block 62. As division-piece-bonded block 62 is seen in its thickness direction, first face 71 and second face 72 each have a rectangular shape in plan view.

Third face 73 and fourth face 74 are disposed on the opposite sides. Third face 73 and fourth face 74 are disposed at the both ends of division-piece-bonded block 62 in the stacking direction of block division pieces 32. Third face 73 and fourth face 74 are continuous with the short sides of first face 71 and second face 72 each having a rectangular shape in plan view. Third face 73 and fourth face 74 are formed by the both-end surfaces of block division pieces 32 among a plurality of stacked block division pieces 32.

Fifth face 75 and sixth face 76 are disposed on the opposite sides. Fifth face 75 and sixth face 76 are disposed at the both ends of division-piece-bonded block 62 in the thickness direction of division-piece-bonded block 62 and in the direction orthogonal to the stacking direction of block division pieces 32. Fifth face 75 and sixth face 76 are continuous with the long sides of first face 71 and second face 72 each having a rectangular shape in plan view.

With reference to FIG. 7 and FIG. 8, division-piece-bonded block 62 is then worked into a shape such that division-piece-bonded block 62 includes: first surface 41 and second surface 42 disposed on the opposite sides in the thickness direction; third surface 43 and fourth surface 44 continuous with first surface 41 and second surface 42, and disposed on the opposite sides; and fifth surface 45 and sixth surface 46 continuous with first surface 41, second surface 42, third surface 43, and fourth surface 44, and disposed on the opposite sides, where first surface 41 and second surface 42 each have a parallelogram shape in plan view, third surface 43 and fourth surface 44 are parallel to each other, and fifth surface 45 and sixth surface 46 extend planarly from third surface 43 to fourth surface 44 (that is, the skew form of permanent magnet 31 in FIG. 2).

Specifically, as shown in FIG. 7, third face 73 of division-piece-bonded block 62 is cut along an oblique direction relative to third face 73 (working indicated by a broken line 103 in FIG. 7), and fourth face 74 of division-piece-bonded block 62 is cut along an oblique direction relative to fourth face 74 (working indicated by a broken line 104 in FIG. 7). Thus, the work surface of third face 73 forms third surface 43 of permanent magnet 31, and the work surface of fourth face 74 forms fourth surface 44 of permanent magnet 31. Further, fifth face 75 remaining unworked forms fifth surface 45 of permanent magnet 31, and sixth face 76 remaining unworked forms sixth surface 46 of permanent magnet 31. Fifth surface 45 and sixth surface 46 form smooth planes extending from third surface 43 to fourth surface 44.

Fifth face 75 and sixth face 76 of division-piece-bonded block 62 may be cut so that the work surfaces of them form fifth surface 45 and sixth surface 46 of permanent magnet 31.

As shown in FIG. 8, first face 71 of division-piece-bonded block 62 is cut into a concave circular arc shape as seen from second face 72 (working indicated by a broken line 105 in FIG. 8). Second face 72 of division-piece-bonded block 62 is cut into a convex circular arc shape as seen from first face 71 (working indicated by a broken line 106 in FIG. 8). Thus, the work surface of first face 71 forms first surface 41 of permanent magnet 31, and the work surface of second face 72 forms second surface 42 of permanent magnet 31.

A coating treatment is then applied to the surface of division-piece-bonded block 62 to obtain permanent magnet 31 in FIG. 2.

In the present embodiment, the coating treatment is applied to division-piece-bonded block 62 in a massive form, thus enabling a simpler coating step than in the case of applying a coating treatment for each of block division pieces 32 individually.

With reference to FIG. 1, a step of providing a plurality of permanent magnets 31 on the outer periphery of rotor core 21 is then performed. In this step, a plurality of permanent magnets 31 are arranged on the outer periphery of rotor core 21 so that: first surface 41 faces the outer peripheral surface of rotor core 21; third surface 43 and fourth surface 44 are positioned at the both ends of each permanent magnet 31 in the axial direction of rotor core 21 (the axial direction of central axis 101); and, between permanent magnets 31 adjacent to each other, fifth surface 45 and sixth surface 46 face each other.

A plurality of permanent magnets 31 are bonded to rotor core 21 with an adhesive applied to first surface 41 of permanent magnet 31 and/or to the outer peripheral surface of rotor core 21. By the steps described above, rotor 10 in FIG. 1 is completed.

Figure 9:
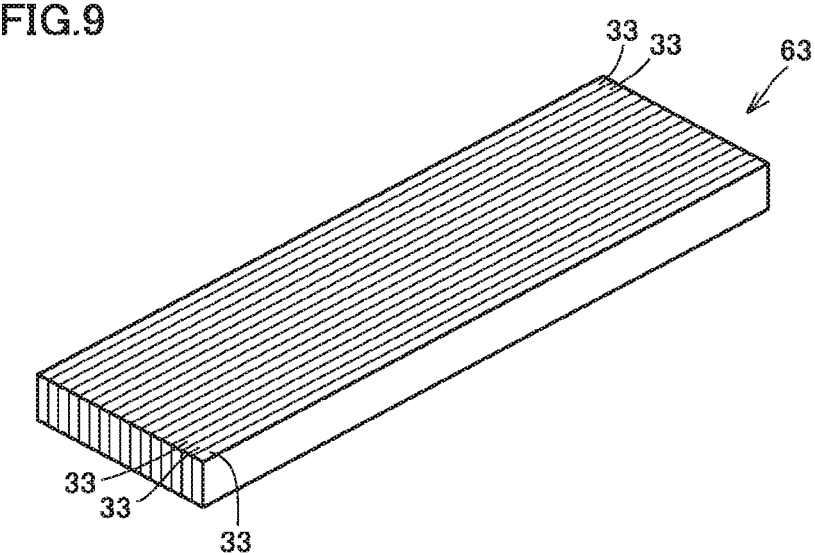
FIG. 9 is a perspective view showing a first variation of a division-piece-bonded block shown in FIG. 6.

FIG. 9 is a perspective view showing a first variation of the division-piece-bonded block shown in FIG. 6. With reference to FIG. 9, in this variation, magnet block 61 is cut in its thickness direction to obtain block division pieces 33, which are division pieces of magnet block 61. At this time, magnet block 61 is cut along the lengthwise direction of the rectangular shape in plan view. Block division pieces 33 are then bonded together to form a division-piece-bonded block 63 having a shape corresponding to the shape of magnet block 61.

Figure 10:
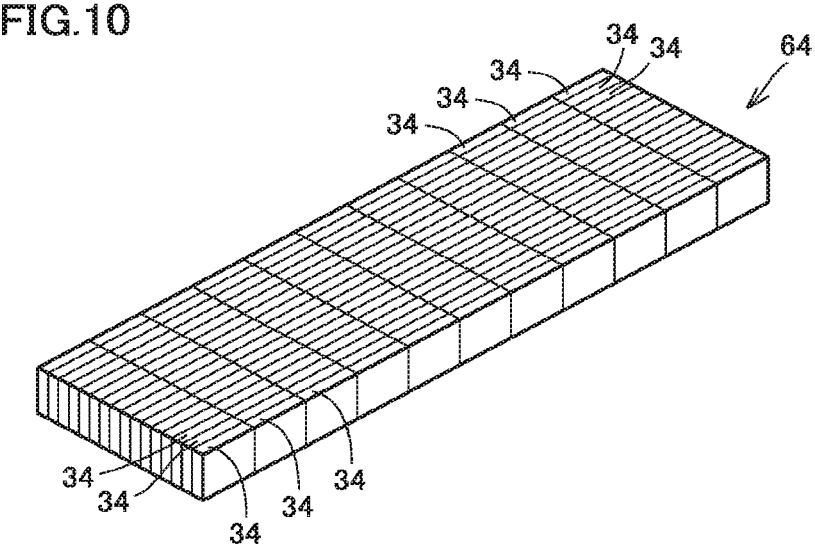
FIG. 10 shows a second variation of a division-piece-bonded block shown in FIG. 6.

FIG. 10 shows a second variation of the division-piece-bonded block shown in FIG. 6. With reference to FIG. 10, in this variation, magnet block 61 is cut in its thickness direction to obtain block division pieces 34, which are division pieces of magnet block 61. At this time, magnet block 61 is cut along the widthwise direction and the lengthwise direction of the rectangular shape in plan view. Block division pieces 34 are then bonded together to form a division-piece-bonded block 64 having a shape corresponding to the shape of magnet block 61.

As shown in these variations, magnet block 61 may be divided in any manner that can reduce an eddy current loss.

Next, the advantageous effects brought about by rotor 10 and the method for manufacturing a rotor in the present embodiment are described by referring to problems of an ideal skew form and a skew form in a comparative example.

Figure 11:
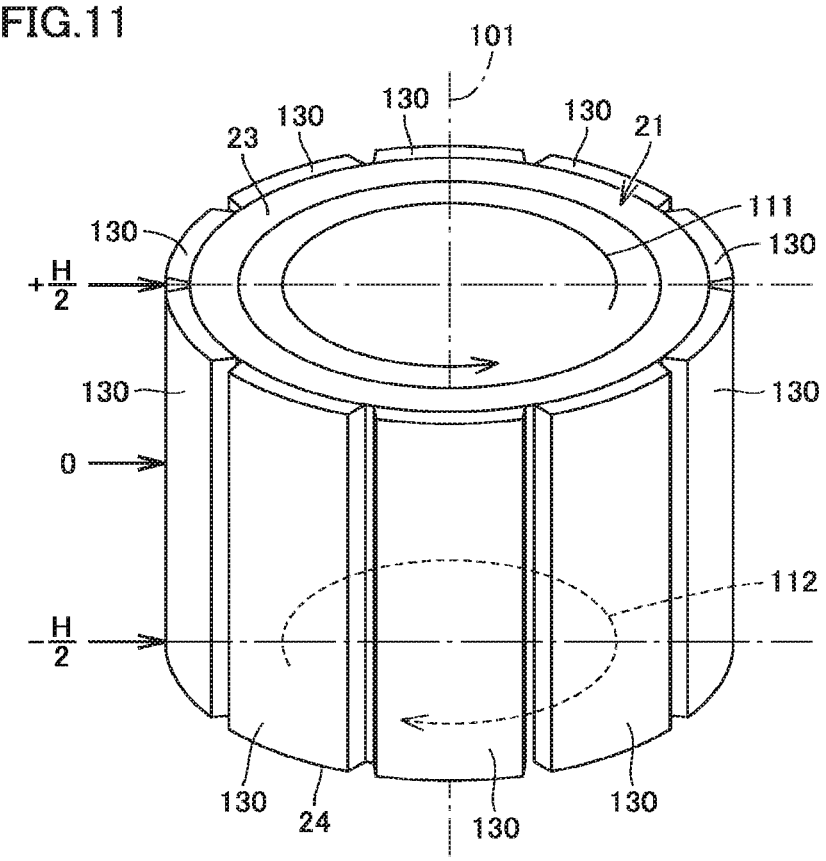
FIG. 11 is a perspective view showing a basic concept of ideal skew.
Figure 12:
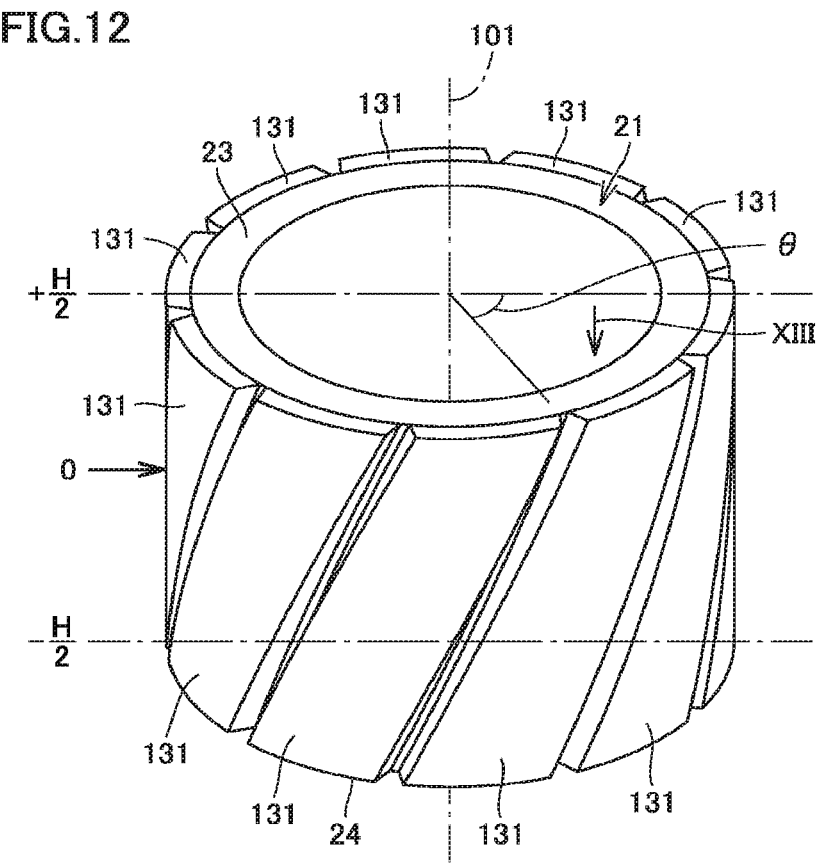
FIG. 12 is a perspective view showing a basic concept of ideal skew.

FIG. 11 and FIG. 12 are perspective views showing a basic concept of ideal skew. In FIG. 11, when permanent magnets 130 have a length (height) of H in the axial direction of central axis 101, the upper end position of permanent magnets 130 in the height direction is denoted by "+H/2", the lower end position of permanent magnets 130 in the height direction is denoted by "−H/2", and the intermediate position between the upper end position and the lower end position of permanent magnets 130 is denoted by "0". In FIG. 12, an angle to a particular position around central axis 101 is denoted by "θ".

With reference to FIG. 11 and FIG. 12, permanent magnets 131 having an ideal skew form can be obtained by twisting permanent magnets 130 in the circumferential direction around central axis 101, permanent magnets 130 each having a rectangular shape as seen in a radial direction.

Specifically, permanent magnets 131 having an ideal skew form can be obtained by twisting permanent magnets 130 in one direction indicated by an arrow 111 from the intermediate position to the upper end position of permanent magnets 130, and by twisting permanent magnets 130 in the opposite direction indicated by an arrow 112 from the intermediate position to the lower end position of permanent magnets 130.

Figure 13:
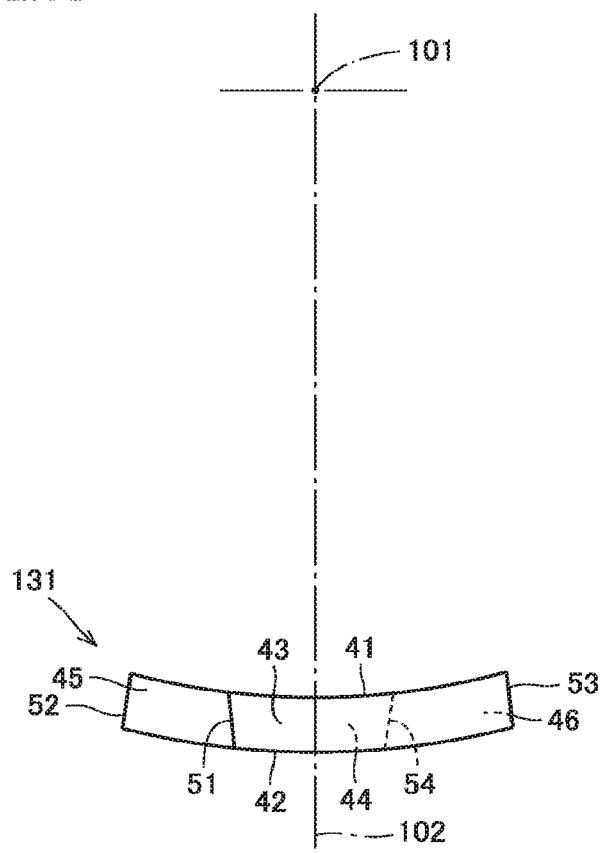
FIG. 13 shows a permanent magnet in FIG. 12 as seen from the direction indicated by arrow XIII.

FIG. 13 shows a permanent magnet in FIG. 12 as seen from the direction indicated by arrow XIII. Reference numbers for permanent magnet 131 in FIG. 13 correspond to those for permanent magnet 31 in FIG. 3.

With reference to FIG. 13, in permanent magnet 131 having an ideal skew form, edge line 51 and edge line 53 are parallel to each other, and edge line 52 and edge line 54 are parallel to each other. Assuming imaginary straight line 102 extending from central axis 101 toward the central position of permanent magnet 131 in the circumferential direction (the central position between edge line 52 and edge line 53), edge line 51 and edge line 53 incline toward one side in the circumferential direction (the twist direction indicated by arrow 111 in FIG. 11) relative to imaginary straight line 102, and edge line 52 and edge line 54 incline toward the other side in the circumferential direction (the twist direction indicated by arrow 112 in FIG. 11) relative to imaginary straight line 102.

Thus, in an ideal skew form, fifth surface 45 is formed by a curved surface extending from edge line 51 to edge line 52, with a varying inclination relative to imaginary straight line 102; and sixth surface 46 is formed by a curved surface extending from edge line 53 to edge line 54, with a varying inclination relative to imaginary straight line 102. In this case, fifth surface 45 and sixth surface 46 each need to be worked into a three-dimensional curved surface, which complicates the manufacturing process of permanent magnet 131.

In the present embodiment, on the other hand, permanent magnet 31 has a skew form where fifth surface 45 and sixth surface 46 extend planarly from third surface 43 to fourth surface 44 so that fifth surface 45 and sixth surface 46 are parallel to each other. This enables a simple step of working permanent magnet 31 to obtain a skew form.

Figure 14:
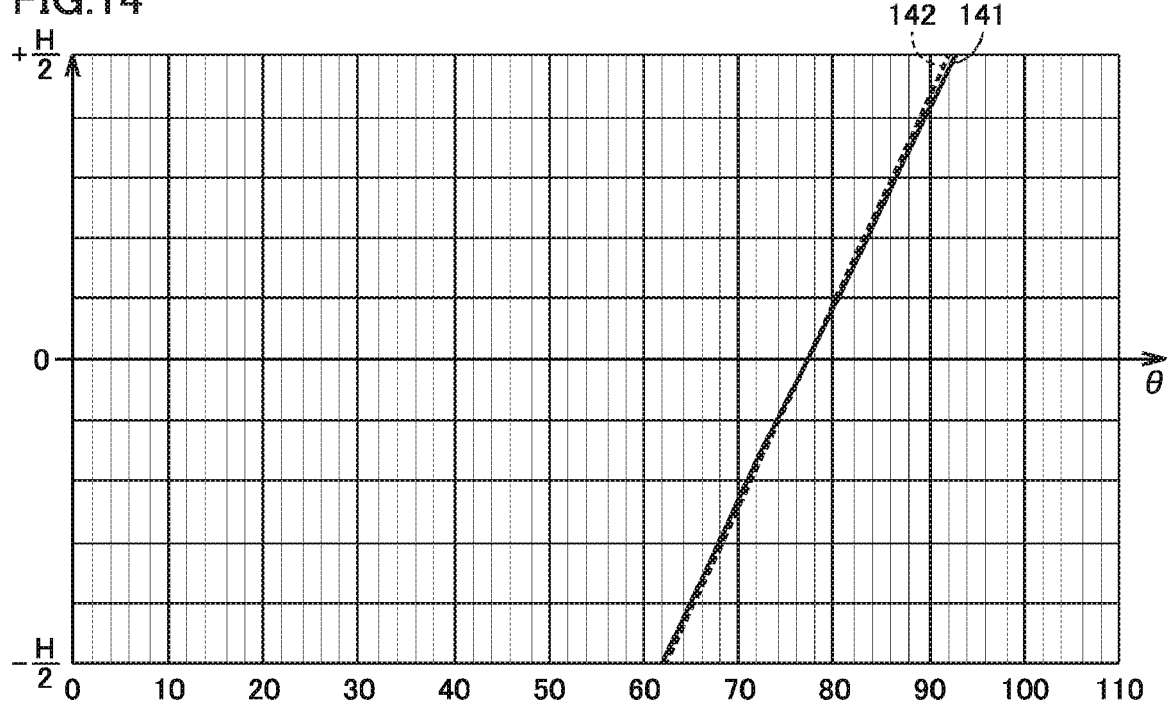
FIG. 14 is a graph showing a deviation (adjacent to a gap from a stator) of a skew form in the present embodiment from an ideal skew form.
Figure 15:
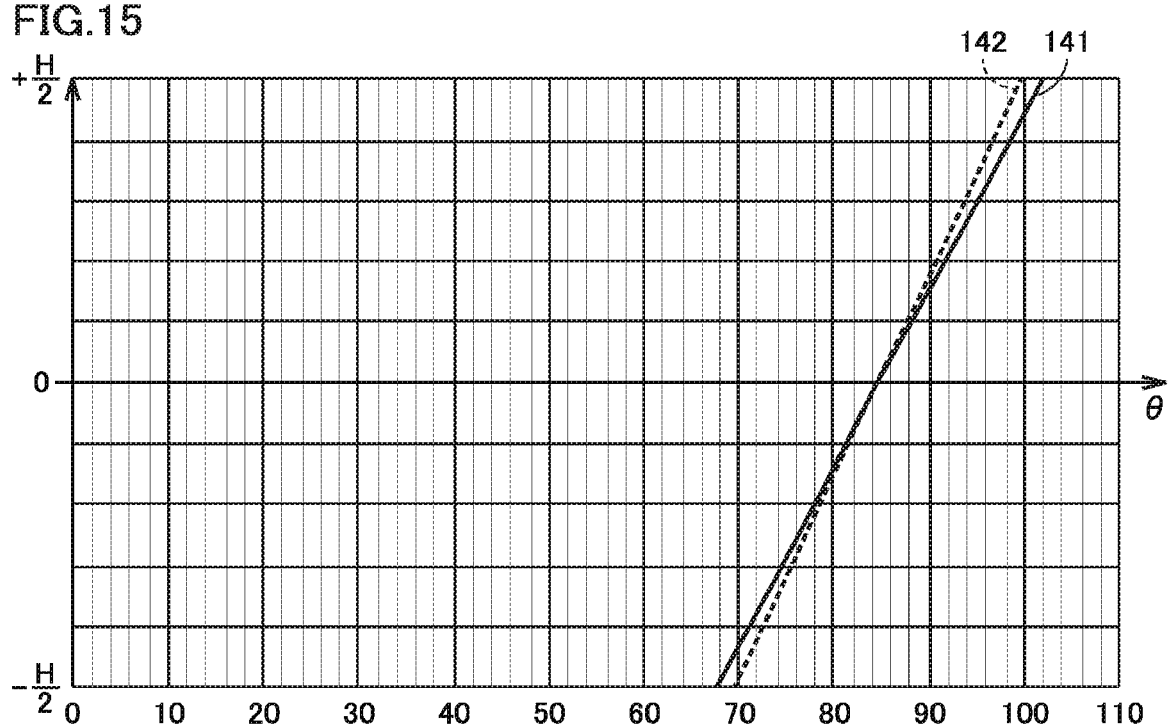
FIG. 15 is a graph showing a deviation (adjacent to a rotor core) of a skew form in the present embodiment from an ideal skew form.

FIG. 14 is a graph showing a deviation (adjacent to a gap from a stator) of a skew form in the present embodiment from an ideal skew form. FIG. 15 is a graph showing a deviation (adjacent to a rotor core) of a skew form in the present embodiment from an ideal skew form.

With reference to FIG. 14 and FIG. 15, a skew form in the present embodiment is indicated by a solid line 141, whereas an ideal skew form is indicated by a broken line 142. In the skew form in the present embodiment, an amount of deviation from the ideal skew form is larger as the position is away from the intermediate position "0" toward the upper end position "+H/2" and toward the lower end position "−H/2" of permanent magnet 130. However, the amount of deviation does not so much affect the skew effect of reducing the cogging torque and is allowable.

Figure 16:
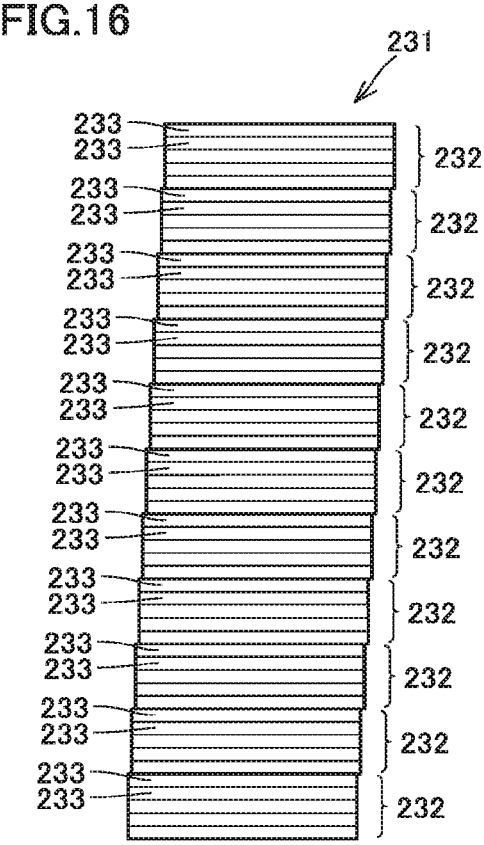
FIG. 16 shows a permanent magnet having a skew form in a comparative example.

FIG. 16 shows a permanent magnet having a skew form in a comparative example. With reference to FIG. 16, a permanent magnet 231 having a skew form in this comparative example is formed by combining a plurality of division-piece-bonded units 232. A plurality of division-piece-bonded units 232 are stacked in the direction of the rotational axis of the rotor while shifting in the circumferential direction by a regular distance, thus achieving a pseudo skew form. Each division-piece-bonded unit 232 is constituted of a plurality of block division pieces 233 (corresponding to block division pieces 32 in the present embodiment) stacked in the direction of the rotational axis of the rotor.

In this comparative example, first, a plurality of block division pieces 233 are bonded to form division-piece-bonded units 232. Then, a plurality of division-piece-bonded units 232 are bonded to the outer peripheral surface of the rotor core. In this case, since a plurality of division-piecebonded units 232 are sacked in the direction of the rotational axis of the rotor, permanent magnet 231 has a low dimensional accuracy in the direction of the rotational axis of the rotor. Further, the manufacturing process of the rotor is complicated because many division-piece-bonded units 232 are bonded to the outer peripheral surface of the rotor core, and because a plurality of division-piece-bonded units 232 have to be shifted in position when attached to the outer peripheral surface of the rotor core for each permanent magnet 231.

Unlike this, in the present embodiment, third face 73 and fourth face 74 of division-piece-bonded block 62 are worked in the step shown in FIG. 7. Therefore, permanent magnet 31 has a high dimensional accuracy in the stacking direction of block division pieces 32 (the direction of the rotational axis of the rotor). Further, since each permanent magnet 31 is constituted of one division-piece-bonded block 62, permanent magnets 31 can be attached with fewer man-hours without an expert technique.

According to rotor 10 and the method for manufacturing a rotor in embodiment 1 of the present invention configured as above, a rotor having reduced cogging torque can be obtained by a simple manufacturing process.

Although the present embodiment describes a case in which the present invention is applied to a rotor for a main shaft electric motor of a machine tool, this is not limitative. For example, the present invention may also be applied to an electric motor for a common industrial machine.

Embodiment 2

Figure 17:
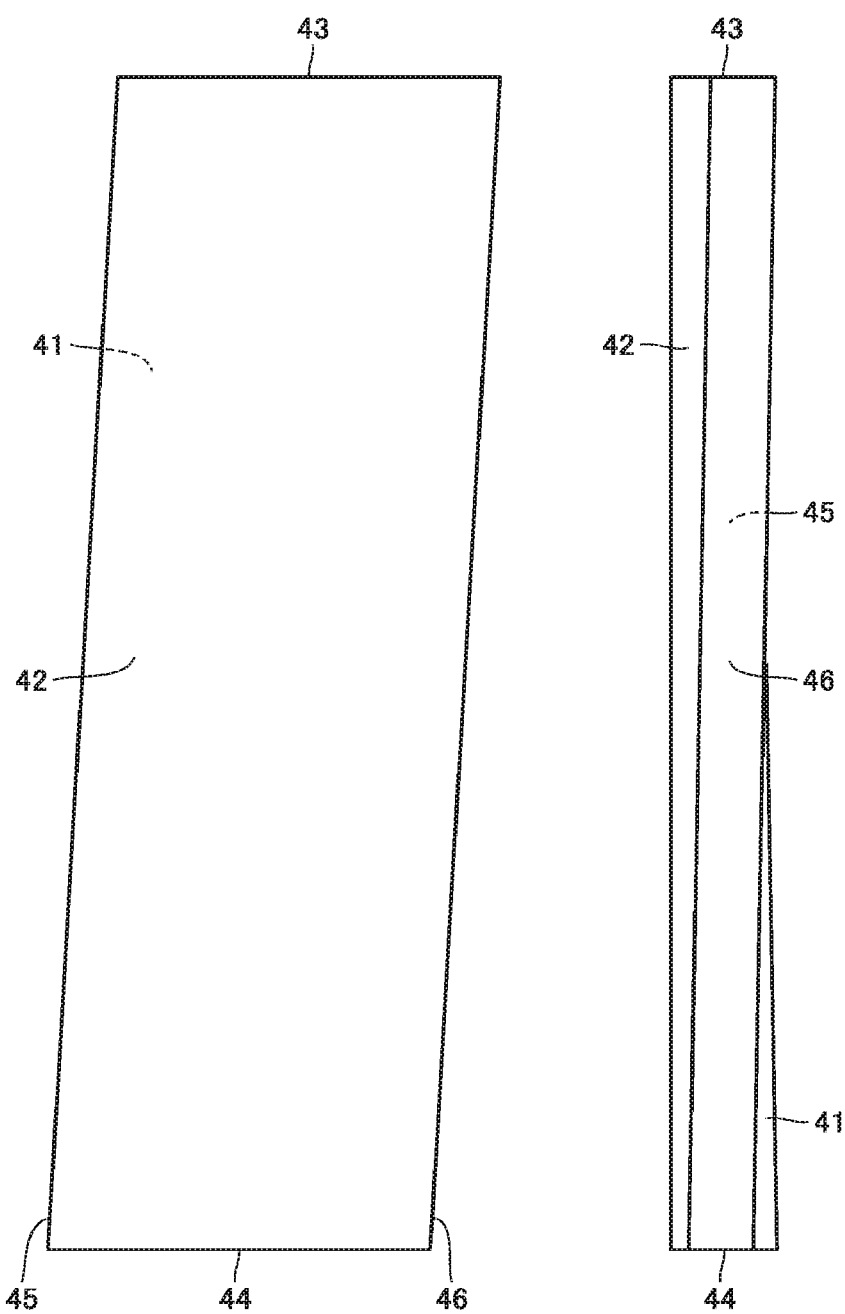
FIG. 17 is a trihedral view showing a permanent magnet constituting a rotor in an embodiment 2 of the present invention.

FIG. 17 is a trihedral view showing a permanent magnet constituting a rotor in embodiment 2 of the present invention. FIG. 17 corresponds to FIG. 2 in embodiment 1. A rotor and a method for manufacturing a rotor in the present embodiment basically have the same configuration and steps as rotor 10 and the method for manufacturing a rotor in embodiment 1. The explanation of the common configuration and steps is not repeated hereinafter.

With reference to FIG. 17, a rotor in the present embodiment includes a permanent magnet 36, instead of permanent magnet 31 in embodiment 1. Permanent magnet 36 is formed by a magnet block. Permanent magnet 36 has the same appearance as permanent magnet 31 constituted of a plurality of bonded block division pieces 32 in embodiment 1.

With reference to FIG. 4, in a method for manufacturing a rotor in the present embodiment, thin plate magnet block 61 is prepared in the step of producing permanent magnet 36.

With reference to FIG. 17, magnet block 61 is then worked into a shape such that magnet block 61 includes: first surface 41 and second surface 42 disposed on the opposite sides in the thickness direction; third surface 43 and fourth surface 44 continuous with first surface 41 and second surface 42, and disposed on the opposite sides; and fifth surface 45 and sixth surface 46 continuous with first surface 41, second surface 42, third surface 43, and fourth surface 44, and disposed on the opposite sides, where first surface 41 and second surface 42 each have a parallelogram shape in plan view, third surface 43 and fourth surface 44 are parallel to each other, and fifth surface 45 and sixth surface 46 extend planarly from third surface 43 to fourth surface 44 so that fifth surface 45 and sixth surface 46 are parallel to each other. Specifically, magnet block 61 is worked similarly to division-piece-bonded block 62 in embodiment 1.

A coating treatment is then applied to the surface of magnet block 61 to obtain permanent magnet 36 in FIG. 17.

The rotor and the method for manufacturing a rotor in embodiment 2 of the present invention configured as above can bring about the same advantageous effects as those of embodiment 1.

Embodiment 3

FIG. 18 shows a permanent magnet constituting a rotor in embodiment 3 of the present invention. FIG. 18 corresponds to FIG. 3 in embodiment 1. A rotor and a method for manufacturing a rotor in the present embodiment basically have the same configuration and steps as rotor 10 and the method for manufacturing a rotor in embodiment 1. The explanation of the common configuration and steps is not repeated hereinafter.

With reference to FIG. 18, a rotor in the present embodiment includes a permanent magnet 37, instead of permanent magnet 31 in embodiment 1.

Fifth surface 45 and sixth surface 46 extend planarly from third surface 43 to fourth surface 44. Fifth surface 45 and sixth surface 46 are not parallel to each other. As permanent magnet 37 is seen from the outer side in a radial direction with respect to central axis 101, fifth surface 45 and sixth surface 46 incline in an oblique direction relative to central axis 101. As permanent magnet 37 is seen in the axial direction of central axis 101, fifth surface 45 and sixth surface 46 are provided along a radial direction with respect to central axis 101. Fifth surface 45 and sixth surface 46 are provided so that the distance from central axis 101 and an imaginary plane including imaginary straight line 102 is larger as the position is away from the internal circumference side toward the outer circumference side with respect to central axis 101. Edge line 51 and edge line 52 are parallel to each other, and edge line 53 and edge line 54 are parallel to each other. Edge line 51 and edge line 52 are not parallel to edge line 53 and edge line 54.

In a method for manufacturing a rotor in the present embodiment, division-piece-bonded block 62 is worked into a skew form where fifth surface 45 and sixth surface 46 extend planarly from third surface 43 to fourth surface 44 and extend along a radial direction with respect to central axis 101, instead of the step of working division-piece-bonded block 62 in embodiment 1.

The shape of fifth surface 45 and sixth surface 46 in the present embodiment may be applied to permanent magnet 36 in embodiment 2.

The rotor and the method for manufacturing a rotor in embodiment 3 of the present invention configured as above can bring about the same advantageous effects as those of embodiment 1.

A method for manufacturing a rotor according to the present invention is a method for manufacturing a rotor including a rotor core and a plurality of permanent magnets arranged in the circumferential direction on the outer periphery of the rotor core, the plurality of permanent magnets being arranged so as to be inclined relative to the axial direction of the rotor core. The method for manufacturing a rotor includes: producing each of the permanent magnets; and providing the plurality of permanent magnets on the outer periphery of the rotor core. The producing of each of the permanent magnets includes: preparing a thin plate magnet block; and working the magnet block into a shape such that the magnet block includes: a first surface and a second surface disposed on opposite sides in the thickness direction; a third surface and a fourth surface continuous with the first surface and the second surface, and disposed on opposite sides; and a fifth surface and a sixth surface continuous with the first surface, the second surface, the third surface, and the fourth surface, and disposed on opposite sides, the first surface and the second surface each having a parallelogram shape in plan view, the third surface and the fourth surface being parallel to each other, the fifth surface and the sixth surface extending planarly from the third surface to the fourth surface. The providing of the plurality of permanent magnets on the outer periphery of the rotor core includes arranging the plurality of permanent magnets on the outer periphery of the rotor core so that: the first surface faces the outer peripheral surface of the rotor core; the third surface and the fourth surface are positioned at both ends of each of the permanent magnets in the axial direction of the rotor core; and between the permanent magnets adjacent to each other, the fifth surface and the sixth surface face each other.

According to the method for manufacturing a rotor configured in such a way, the magnet block is worked into a skew form where the fifth surface and the sixth surface extend planarly from the third surface to the fourth surface. Thus, a rotor having reduced cogging torque can be obtained by a simple step.

Preferably, the preparing of the magnet block includes: cutting a thin plate magnet block in the thickness direction of the magnet block to obtain division pieces of the magnet block; and bonding the division pieces of the magnet block together to obtain a magnet block having a shape corresponding to a shape of the original magnet block.

According to the method for manufacturing a rotor configured in such a way, a rotor having a reduced eddy current loss can be obtained by a simple step.

Preferably, the bonding of the division pieces of the magnet block together includes stacking the division pieces of the magnet block in one direction. The working of the magnet block includes working end faces of the magnet block at both ends in the stacking direction of the division pieces of the magnet block.

According to the method for manufacturing a rotor configured in such a way, the length of each permanent magnet in the stacking direction of the division pieces of the magnet block can be accurately adjusted.

Preferably, the producing of each of the permanent magnets further includes coating a surface of the magnet block after the working of the magnet block.

According to the method for manufacturing a rotor configured in such a way, the coating step can be made simpler than in the case of applying the coating treatment for each of the division pieces of the magnet block individually.

Preferably, the producing of each of the permanent magnets further includes working the magnet block into a shape such that the first surface and the second surface extend in a circular arc shape from the fifth surface to the sixth surface.

According to the method for manufacturing a rotor configured in such a way, the first surface and the second surface of the magnet block can be worked into a shape according to the characteristics of the rotor core.

A rotor according to the present invention includes a rotor core; and a plurality of permanent magnets arranged in the circumferential direction on the outer periphery of the rotor core, the plurality of permanent magnets being arranged so as to be inclined relative to the axial direction of the rotor core. Each of the plurality of permanent magnets includes: a first surface and a second surface disposed on opposite sides; a third surface and a fourth surface continuous with the first surface and the second surface, and disposed on opposite sides; and a fifth surface and a sixth surface continuous with the first surface, the second surface, the third surface, and the fourth surface, and disposed on opposite sides, the first surface and the second surface each having a parallelogram shape in plan view, the third surface and the fourth surface being parallel to each other, the fifth surface and the sixth surface extending planarly from the third surface to the fourth surface. The plurality of permanent magnets are arranged on the outer periphery of the rotor core so that: the first surface faces the outer peripheral surface of the rotor core; the third surface and the fourth surface are positioned at both ends of each of the permanent magnets in the axial direction of the rotor core; and between the permanent magnets adjacent to each other, the fifth surface and the sixth surface face each other.

According to the rotor configured in such a way, each of the permanent magnets has a skew form where the fifth surface and the sixth surface extend planarly from the third surface to the fourth surface. This can simplify the manufacturing process of a rotor having reduced cogging torque.

Preferably, each of the permanent magnets comprises division pieces of a magnet block bonded together.

According to the rotor configured in such a way, generation of an eddy current loss can be reduced.

Preferably, the first surface and the second surface extend in a circular arc shape from the fifth surface to the sixth surface.

According to the rotor configured in such a way, the first surface and the second surface of the magnet block can be shaped in accordance with the characteristics of the rotor core.

It should be understood that the embodiments disclosed herein are by way of example in every respect, not by way of limitation. The scope of the present invention is defined not by the above description but by the claims, and is intended to include any modification within the meaning and scope equivalent to the claims.

INDUSTRIAL APPLICABILITY

The present invention is applicable to, for example, an electric motor for driving a main shaft of a machining center to rotate.

REFERENCE SIGNS LIST

10: rotor;
21: rotor core;
23, 24: end face;
31, 36, 37, 130, 131, 231: permanent magnet;
32, 33, 34, 233: block division piece;
41: first surface;
42: second surface;
43: third surface;
44: fourth surface;
45: fifth surface;
46: sixth surface;
51, 52, 53, 54: edge line;
61: magnet block;
62, 63, 64: division-piece-bonded block;
71: first face;
72: second face;
73: third face;
74: fourth face;
75: fifth face;
76: sixth face;
101: central axis;

102: imaginary straight line;
232: division-piece-bonded unit

The invention claimed is:

1. A method for manufacturing a rotor including a rotor core and a plurality of permanent magnets arranged in a circumferential direction on an outer periphery of the rotor core, the plurality of permanent magnets being arranged so as to be inclined relative to an axial direction of the rotor core, the method comprising:
producing each of the permanent magnets; and
providing the plurality of permanent magnets on the outer periphery of the rotor core,
the producing of each of the permanent magnets including:
preparing a thin plate magnet block; and
working the magnet block into a shape such that the magnet block includes:
a first surface and a second surface disposed on opposite sides in a thickness direction;
a third surface and a fourth surface continuous with the first surface and the second surface, and disposed on opposite sides; and
a fifth surface and a sixth surface continuous with the first surface, the second surface, the third surface, and the fourth surface, and disposed on opposite sides,
the first surface and the second surface each having a parallelogram shape in plan view,
the third surface and the fourth surface being parallel to each other,
the fifth surface and the sixth surface extending planarly from the third surface to the fourth surface,
the providing of the plurality of permanent magnets on the outer periphery of the rotor core including arranging the plurality of permanent magnets on the outer periphery of the rotor core in a position such that:
the first surface faces an outer peripheral surface of the rotor core;
the third surface and the fourth surface are positioned at both ends of each of the permanent magnets in the axial direction of the rotor core; and
between the permanent magnets adjacent to each other, the fifth surface and the sixth surface face each other, and
wherein the preparing of the magnet block includes:
cutting a thin plate magnet block in a thickness direction of the magnet block to obtain division pieces of the magnet block; and
bonding the division pieces of the magnet block together to obtain a magnet block having a shape corresponding to a shape of the original magnet block.

2. The method for manufacturing a rotor according to claim 1, wherein
the bonding of the division pieces of the magnet block together includes stacking the division pieces of the magnet block in one direction, and
the working of the magnet block includes working end faces of the magnet block at both ends in a stacking direction of the division pieces of the magnet block.

3. The method for manufacturing a rotor according to claim 1, wherein
the producing of each of the permanent magnets further includes working the magnet block into a shape such that the first surface and the second surface extend in a circular arc shape from the fifth surface to the sixth surface.

* * * * *